(12) United States Patent
Ehlert et al.

(10) Patent No.: US 10,652,508 B2
(45) Date of Patent: May 12, 2020

(54) PROJECTOR AND METHOD FOR PROJECTING AN IMAGE PIXEL BY PIXEL

(71) Applicant: Robert Bosch GmbH, Stuttgart (DE)

(72) Inventors: Alexander Ehlert, Reutlingen (DE);
Felix Schmidt, Stuttgart (DE); Gael Pilard, Wankheim (DE); Niklas Dittrich, Pliezhausen (DE)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 15/531,480

(22) PCT Filed: Nov. 23, 2015

(86) PCT No.: PCT/EP2015/077352
§ 371 (c)(1),
(2) Date: May 30, 2017

(87) PCT Pub. No.: WO2016/087249
PCT Pub. Date: Jun. 9, 2016

(65) Prior Publication Data
US 2017/0272713 A1    Sep. 21, 2017

(30) Foreign Application Priority Data

Dec. 1, 2014 (DE) .................. 10 2014 224 552

(51) Int. Cl.
*G06F 3/01* (2006.01)
*H04N 9/31* (2006.01)
(Continued)

(52) U.S. Cl.
CPC ........... *H04N 9/3155* (2013.01); *G06F 3/017* (2013.01); *G06F 3/0418* (2013.01);
(Continued)

(58) Field of Classification Search
None
See application file for complete search history.

(56) References Cited

U.S. PATENT DOCUMENTS 9,285,894 B1 *   3/2016   Wang ................. G06F 3/04847
9,710,160 B2 *   7/2017   Brunn .................. G06F 3/0485
(Continued)

FOREIGN PATENT DOCUMENTS

CN         103076983 A       5/2013
DE       102012206851 A1    10/2013
(Continued)

OTHER PUBLICATIONS

International Search Report dated Mar. 1, 2016 of the corresponding International Application PCT/EP2015/077352 filed Nov. 23, 2015.

*Primary Examiner* — Reza Aghevli
(74) *Attorney, Agent, or Firm* — Norton Rose Fulbright US LLP; Gerard Messina

(57) ABSTRACT

A method and a projector for projecting an image pixel by pixel includes a control unit controlling a light diode device for emitting visible light, pixel by pixel, in accordance with the image to be projected and controlling an infrared diode device for emitting infrared radiation pixel by pixel based on the image to be projected and on a back radiation model, in such a way that a setpoint back radiation intensity measuring signal to be expected pixel by pixel for the actual back radiation intensity measuring signal has a predetermined value for predetermined pixels; and a radiation intensity detection device detecting pixel by pixel a back radiation intensity of reflected visible light and reflected infrared radiation and generating pixel by pixel an actual back radiation intensity measuring signal based on the detected back radiation intensities.

7 Claims, 3 Drawing Sheets

(51) Int. Cl.
  *G06F 3/00* (2006.01)
  *H04N 5/33* (2006.01)
  *G06F 3/042* (2006.01)
  *G06F 3/041* (2006.01)

(52) U.S. Cl.
  CPC ........... *G06F 3/0425* (2013.01); *H04N 5/332* (2013.01); *H04N 9/3129* (2013.01); *H04N 9/3135* (2013.01); *H04N 9/3173* (2013.01); *H04N 9/3194* (2013.01)

(56) References Cited

U.S. PATENT DOCUMENTS

| | | | | |
|---|---|---|---|---|
| 9,940,018 | B2* | 4/2018 | Brunn | G06F 3/0485 |
| 2007/0035707 | A1* | 2/2007 | Margulis | G03B 21/26 |
| | | | | 353/122 |
| 2008/0006698 | A1* | 1/2008 | Kotlarsky | G06K 7/10722 |
| | | | | 235/462.42 |
| 2009/0091718 | A1* | 4/2009 | Obi | G03B 21/56 |
| | | | | 355/30 |
| 2010/0201895 | A1* | 8/2010 | Golub | A61B 5/0059 |
| | | | | 348/759 |
| 2012/0155060 | A1* | 6/2012 | Ninan | G02B 26/08 |
| | | | | 362/84 |
| 2012/0188207 | A1* | 7/2012 | Usukura | G06F 3/0412 |
| | | | | 345/175 |
| 2012/0290950 | A1* | 11/2012 | Rapaport | H04L 51/32 |
| | | | | 715/753 |
| 2012/0320157 | A1* | 12/2012 | Junuzovic | G03B 15/05 |
| | | | | 348/46 |
| 2013/0100075 | A1* | 4/2013 | Viswanathan | G06F 3/0416 |
| | | | | 345/175 |
| 2013/0127716 | A1* | 5/2013 | Nagashima | H04N 9/3129 |
| | | | | 345/158 |
| 2014/0104463 | A1* | 4/2014 | Spears | G06F 3/042 |
| | | | | 348/263 |
| 2014/0368640 | A1* | 12/2014 | Strandemar | G06T 3/00 |
| | | | | 348/136 |
| 2014/0368641 | A1* | 12/2014 | Strandemar | H04N 5/33 |
| | | | | 348/136 |
| 2015/0193941 | A1* | 7/2015 | Wang | G06F 3/0425 |
| | | | | 348/571 |
| 2016/0025977 | A1* | 1/2016 | Osterhout | G02B 27/0172 |
| | | | | 345/8 |
| 2016/0026239 | A1* | 1/2016 | Border | G02B 27/017 |
| | | | | 345/8 |
| 2016/0027414 | A1* | 1/2016 | Osterhout | G02B 27/0172 |
| | | | | 345/647 |
| 2016/0062118 | A1* | 3/2016 | Osterhout | G02B 27/0172 |
| | | | | 345/8 |
| 2017/0261426 | A1* | 9/2017 | Hirata | G01N 21/27 |
| 2017/0261846 | A1* | 9/2017 | Maes | G03B 17/54 |

FOREIGN PATENT DOCUMENTS

| | | | | |
|---|---|---|---|---|
| EP | 2600184 | A1 | 6/2013 | |
| EP | 2785059 | A1 * | 10/2014 | ......... G03B 21/2073 |
| EP | 2785059 | A1 | 10/2014 | |
| JP | 2005181731 | A | 7/2005 | |
| JP | 2005531790 | A | 10/2005 | |
| JP | 2012032465 | A | 2/2012 | |
| JP | 2013003859 | A | 1/2013 | |
| JP | 2014164205 | A | 9/2014 | |
| TW | 523610 | B | 3/2003 | |
| TW | I281989 | B | 6/2007 | |
| WO | 2011/012168 | A1 | 2/2011 | |
| WO | WO-2011012168 | A1 * | 2/2011 | ........... G01S 7/4814 |

* cited by examiner

PROJECTOR AND METHOD FOR PROJECTING AN IMAGE PIXEL BY PIXEL

CROSS-REFERENCE TO RELATED APPLICATIONS

The present application is the national stage of International Pat. App. No. PCT/EP2015/077352 filed Nov. 23, 2015, and claims priority under 35 U.S.C. § 119 to DE 10 2014 224 552.4, filed in the Federal Republic of Germany on Dec. 1, 2014, the content of each of which is incorporated herein by reference in its entirety.

FIELD OF THE INVENTION

The present invention relates to a method and a projector, more precisely, a light projector for projecting an image, pixel by pixel.

BACKGROUND

Conventional projectors are generally relatively large, heavy and sensitive, so that they are not suited for mobile use. In addition, such devices have a comparatively high energy consumption and the colors produced sometimes appear pale, for example, when sunlight strikes the projection surface.

Technologies which may be used in miniaturized projectors include the so-called laser scanners or scanning laser projectors. In laser scanners, laser beams emitted by laser diodes are moved in such a way that they scan a projection surface pixel by pixel. A color image may be produced by superimposing laser beams of differing colors and by the targeted, time-dependent pixel by pixel projection and non-projection of laser beams. Scanning passes may take place with such a high repetition frequency that to the human eye, an overall image forms, similar to the scanning of the luminescence layer of a cathode ray tube television with an electron beam. Such laser scanners are small and produce images with bold colors. In addition, they operate energy-efficiently, since a laser beam is switched on only if it is actually needed for the projection.

Miniaturized laser scanners, for example, so-called pico projectors, may be installed, for example, in mobile telephones, tablet PCs and in other mobile terminals, or may be designed as mobile telephones, tablet-PCs or other mobile terminals. Projectors are normally controlled with special remote controllers or by pressing buttons on an input surface. Alternatively, it is also known, however, to control the laser scanner using gestures represented as objects introduced in the beam area of the laser scanner. For this purpose, the backscattered light or laser light from the object, for example, from a hand, is detected and based on this a control gesture is determined. This may take place over time, in particular, over multiple projected overall images, as a result of which, for example, a movement of the hand may be detected and interpreted as a control gesture. A hand introduced from the left into the beam area of the laser scanner and pulled out again, for example, may be interpreted as a control gesture for turning to a subsequent photo of a slide show.

In DE 10 2012 206 851 A1, a method and a device are described for ascertaining a gesture carried out in the light cone of a projected image. In this case, all pixels and in each case one or multiple parameter values of the pixels of the projected image are detected and the parameter values are each compared to one parameter comparison value and assigned to a pixel set as a function of the result of the comparison. Based on the assigned pixel set, the gesture carried out in the light cone of the projected image is ascertained.

When ascertaining gestures in the light cone or beam area of a projector or laser scanner, there is normally an evaluation of differences in luminous intensity, which result from an object, for example, a hand, being introduced into the beam area, whose reflection properties for the emitted light differ from the reflection properties of the intended projection surface. The speed and accuracy with which a particular gesture is detected is usually influenced by the image to be projected. For example, a purely black image could be "projected," i.e., no light emission would take place, over a longer period of time, as a result of which no gestures could be detected for the corresponding duration.

SUMMARY

According to an aspect of the present invention, a projector, for projecting an image pixel by pixel, includes a light diode device for emitting visible light pixel by pixel; an infrared diode device for emitting infrared radiation pixel by pixel; a radiation intensity detection device for detecting a back radiation intensity of reflected visible light and reflected infrared radiation pixel by pixel and for generating an actual back radiation intensity measuring signal pixel by pixel on the basis of the back radiation intensities detected pixel by pixel; and a control unit designed to control the light diode device pixel by pixel for emitting the visible light in accordance with the image to be projected and also designed to control the infrared diode device on the basis of the image to be projected and on a back radiation model, pixel by pixel for emitting the infrared radiation in such a way that a setpoint back radiation intensity measuring signal to be expected pixel by pixel for the actual back radiation intensity measuring signal has a predetermined, in particular, constant value for predetermined pixels, which is preferably the same for all of the predetermined pixels.

In other words, the actual back radiation intensity measuring signal describes the actually measured intensity value for the back radiation detected by the radiation intensity detection device in the wave length range of the infrared radiation and of the visible light. The setpoint back radiation measuring signal is not a measuring signal per se but a target or an estimate for the actual back radiation intensity measuring signal. The actual back radiation intensity measuring signal can differ from the setpoint back radiation intensity measuring signal, in particular, if the back radiation model is imprecise and/or if objects are introduced into the beam area of the projector. The latter effect can be utilized, for example, to detect carried out control gestures.

"Pixel by pixel" is intended to mean, in particular, that a measurement or calculation is carried out separately for each pixel and does not require, for example, an averaging or integration, and that the back radiation intensity measuring signal can be generated and evaluated separately for each pixel. The pixel-by-pixel generation of the actual back radiation intensity measuring signal based on the back radiation intensities detected pixel by pixel is intended to mean, in particular, that an actual back radiation intensity measuring signal is generated for each pixel on the basis of the back radiation intensity reflected by this pixel.

A pixel is intended to mean, in particular, a fixed position, toward which light beams modulated according to an image to be projected are emitted, in particular, generated and/or deflected. According to one image to be projected, for example, a first pixel can be intended to be represented in black, for example, at the top to the far left. With each repeated scanning pass, i.e., whenever the laser scanner projects this pixel during the sequential scanning, according to the present invention, the same predetermined value is used for the setpoint back radiation intensity measuring signal in the event the first pixel is associated with the predetermined pixels. It is irrelevant whether a fixed image or a moving image is to be projected. If, after multiple scanning passes, for example, the first pixel is intended to be shown as white in accordance with the image to be projected, the setpoint back radiation intensity measuring signal for the first pixel continues to remain at the predefined constant value.

The constant value is preferably established in such a way that it can be obtained from the infrared diode device even if the light diode device emits no light.

The light diode device and the infrared diode device can include, in particular, a shared optical guiding device or in each case independent optical guiding devices, for example, micro-mirrors, with the aid of which the generated visible light and the generated infrared radiation for "scanning" pixel by pixel, i.e., time-delayed projection of the image to be projected, are deflectable, as well as lenses, apertures, etc.

The radiation intensity detection device can be a photodiode, for example, which is designed to detect both visible light as well as light with wave lengths in the infrared range, preferably in the near-infrared range. Near-infrared in this case, for example, according to DIN 5031, refers to a range of 780 nanometers to 3 micrometers. The infrared radiation emitted by the infrared diode device can lie completely in the IR-A range, which ranges from wave lengths of 780 nanometers to 1400 nanometers or have that as its maximum.

According to another aspect of the present invention, a method for projecting an image pixel by pixel includes: controlling a light diode device of a projector for emitting visible light pixel by pixel according to the image to be projected; detecting pixel by pixel a back radiation intensity of reflected visible light and reflected infrared radiation for the predetermined pixels; generating an actual back radiation intensity measuring signal pixel by pixel on the basis of the detected back radiation intensities; and controlling an infrared diode device of a projector for emitting infrared radiation pixel by pixel on the basis of the image to be projected and on a back radiation model in such a way that a setpoint back radiation intensity measuring signal to be expected pixel by pixel for the actual back radiation intensity measuring signal has a predetermined, in particular, constant value for predetermined pixels.

It can be provided that if the predetermined value is unobtainable beyond a predetermined minimum period, for example, due to a characteristic of an instantaneous projection surface, the predetermined value is then automatically lowered on the basis of the detected actual back radiation intensity measuring signals.

The finding underlying the present invention is the fact that each pixel of an image to be projected is projected with a different radiation intensity, which, however, can be supplemented by infrared light invisible to an observer for multiple or for all pixels of the image, in each case at the predetermined value. Thus, methods, which are based on a spatially resolved detection and evaluation of an inhomogeneous back radiation intensity, which occurs as a result of back radiation of emitted light beams and of emitted infrared radiation and which becomes inhomogeneous, in particular, as a result of any blocking thereof or increased reflection by objects in the beam path, operate particularly reliably and accurately.

According to the present invention, it is possible, for example, in the case of a projection surface assumed to be perfectly reflective and a radiation intensity detection device assumed to be perfectly sensitive, as part of the back radiation model, for infrared radiation to be emitted in each case, precisely pixel by pixel, with such an additional radiation intensity, that the additional radiation intensity of the infrared radiation is added to the radiation intensity of the visible light to be emitted in accordance with the image to be projected to form the predetermined value. Thus, all inhomogeneities of the back radiation intensity, which are based solely on the image to be projected, would be eliminated, so that remaining inhomogeneities, for example, stem from an object introduced into the beam area of the projector. Such an object can, for example, be a hand or a pointer. Based on the back radiation intensity rendered inhomogeneous in this way, it is possible, for example, for methods for gesture control based on the introduced object to be particularly accurately and reliably carried out.

Thus, the total emitted irradiation intensity occurring at a particular pixel of the predetermined pixels is maintained the same, i.e., constant, with each scanning pass, regardless of which color shade and which brightness value in the visible wave length spectrum the particular pixel instantaneously exhibits in accordance with the image to be shown.

Advantageous refinements of the present invention further take into account in the back radiation model that a projection surface is normally not an ideally reflective projection surface, in particular, since the strength of miniaturized projectors lies in the fact that they can be used almost everywhere. According to some specific embodiments, it is provided, therefore, that before the projection and/or during the projection, a continuous adaptation of the back radiation model takes place, which takes the specific properties of the projection surface onto which the image to be projected is instantaneously to be projected, as well as, optionally, objects to be expected to be introduced into the beam area of the projector, into account. Optical properties, for example, reflection coefficients, of such objects may also be detected and used for a more accurate determination of the control gestures.

In one particularly simple case, the back radiation model includes the information that the visible light emitted in each case and the infrared radiation emitted in each case are reflected at a fixed percentage R %, for example, 50%, 80% or 100%, and a sensitivity S of the radiation intensity detection device is the same for all wave lengths of the radiation used, i.e., that the setpoint back radiation intensity measuring signal according to the sensitivity and according to the corresponding percentage of the entire irradiation output P-out-actual is the same across all wave length ranges. In formulas, for a pixel x-ij, where "i" stands for a line of the image to be projected in which the pixel is situated and "j" stands for a column of the image to be projected in which the pixel is situated:

$$I\text{-const}=P\text{-back-setpoint}(x\text{-}ij)=S*R\%*(IR(x\text{-}ij)+IG(x\text{-}ij)+IB(x\text{-}ij)+IIR(x\text{-}ij))=R\%*P\text{-out-actual}(x\text{-}ij).$$

where, I-const refers to the predetermined value, P-back-setpoint refers to the setpoint back radiation intensity measuring signal for the pixel x-ij, IR refers to the radiation intensity of emitted visible light in the red wave length range, IG refers to the radiation intensity of emitted visible light in the green wave length range, IB refers to the radiation intensity of visible light with wavelengths in the blue wave length range, IIR refers to the radiation intensity of the emitted infrared radiation and P-out-actual(x-ij) refers to the irradiation intensity, in each case for each individual pixel x-ij common for all emitted electromagnetic waves.

The radiation intensity IIR(x-ij), with which the infrared radiation is to be emitted toward each pixel x-ij, is ascertainable from the above formula from the values IR(x-ij), IB(x-ij), IG(x-ij) known for each pixel x-ij, and from the predetermined value I-const in accordance with the image to be projected. This also applies analogously to the following formulas, which result from more complex back radiation models.

A refined back radiation model, for example, takes into account the fact that a radiation intensity detection device, for example, a photo diode, is normally variously sensitive to light or to electromagnetic radiation with varying wave lengths. The expected setpoint back radiation intensity measuring signal P'-back-setpoint calculated with the aid of the back radiation model is then made up as follows:

$$I\text{-}const=P'\text{-}back\text{-}setpoint(x\text{-}ij)=R\%*(SR*IR(x\text{-}ij)+SG*IG(x\text{-}ij)+SB*IB(x\text{-}ij)+SIR*IIR(x\text{-}ij)),$$

where SR, SG and SB refer to sensitivities of the radiation intensity detection device to light in the red, green and blue wave length ranges and SIR refers to a sensitivity of the radiation intensity detection device in the wave length range of the infrared radiation, and where IIR(x-ij) is selected according to the present invention in such a way that P'-back-setpoint(x-ij) is constant for each predetermined pixel x-ij. The sensitivities SR, SG, SB, SIR may be constants; however, they can also include, for example, directional dependencies, output dependencies, etc.

The predetermined pixels can, for example, include all pixels of the image to be projected or all images to be projected. However, it can also be provided that the predetermined pixels form an edge of the images to be projected one or multiple pixels wide and/or a matrix-like grid within the image to be projected.

An even more finely differentiated back radiation model can also take wave length-dependent reflection coefficients RR, RG, RB, RIR into account, since for example, tinted projection surfaces or various skin colors of body parts introduced into the beam area of the projector can in each case differently reflect the emitted visible light beams as well as the emitted infrared radiation. This can be expressed by the following formula:

$$I\text{-}const=P''\text{-}back\text{-}setpoint(x\text{-}ij)=R\%R*SR*IR(x\text{-}ij)+R\%G*SG*IG(x\text{-}ij)+R\%B(x\text{-}ij)*SB*IB(x\text{-}ij)+R\%IR(x\text{-}ij)*SIR*IIR(x\text{-}ij)),$$

where R % R, R % G, R % B and R % IR each refers to reflection coefficients constant across the projection surface for light in the red, blue, green and in the infrared wave length range.

The reflection coefficients of the projection surface can be preferably ascertained pixel by pixel during a calibration before the projection of the image to be projected, as a result of which the reflection coefficients R % R(x-ij), R % G(x-ij), R % B(x-ij) and R % IR(x-ij) can be taken into account in the back radiation model, accurate to the pixel with respect to light at the emitted wave lengths both in the visible range as well as in the infrared range. This can be represented by the following formula:

$$I\text{-}const=P'''\text{-}back\text{-}setpoint(x\text{-}ij)=R\%R(x\text{-}ij)*SR*IR(x\text{-}ij)+R\%G(x\text{-}ij)*SG*IG(x\text{-}ij)+R\%B(x\text{-}ij)*SB*IB(x\text{-}ij)+R\%IR(x\text{-}ij)*SIR*IIR(x\text{-}ij)),$$

where P'''(ij)-back-setpoint describes the setpoint back radiation intensity measuring signal of the pixel x-ij.

The back radiation model can also be momentarily adapted, for example, if an object introduced in the beam area of the projector is detected. Immediately upon detection of the object, a recalibration or adaptation of the back radiation model for a subarea of the pixels of the image to be projected may take place, for example. The subarea in this case is selectable in such a way that all pixels influenced by the object introduced into the beam area of the projector fall within the subarea of the pixels. The subarea of the pixels can be expanded or reduced, depending on the movement of the introduced object. For the pixels in the subarea of the pixels, the back radiation model can be adapted pixel by pixel or on average in such a way that the wave length-dependent reflection coefficients of the projection surface are replaced by the wave length-dependent, predetermined or determinable reflection coefficients of the introduced object.

According to another preferred refinement, the projector includes a gesture detection device, which is designed to detect a control gesture based on the actual back radiation intensity measuring signals of the predetermined pixels generated pixel by pixel and to generate a control signal based on the detected control gesture. The gesture detection device can optionally also be designed to transmit the generated control signal to the control unit and/or to an external device, which can be operable or adaptable based on the transmitted control signal. Thus, the projector is easily controllable by control gestures, which are introduced, for example, by hands or objects introduced into the beam area of the projector. The emission of the visible light and of the infrared radiation in such a way that a constant, to be expected setpoint back radiation intensity measuring signal for the predetermined pixels results, means that in the ideal case of a perfect back radiation model, the actually generated actual back radiation intensity measuring signal for the predetermined pixels is constant. In the case of an, in reality, imperfect back radiation model, the result is still an advantageous, substantial continuity of the actual back radiation intensity measuring signal for the predetermined pixels, which enables a particularly accurate and robust detection of the control gestures.

According to another preferred refinement, the projector includes a calibration device, with the aid of which the back radiation model is automatically creatable or automatically adaptable based on at least one difference between at least one actual back radiation intensity measuring signal of at least one pixel of the predetermined pixels and the corresponding setpoint back radiation intensity measuring signal of the same pixel of the predetermined pixels. The adaptation of the back radiation model, which is also referable to as a calibration of the projector, can take place continuously, regularly and/or at the request of a user. An additional or alternative calibration is also conceivable when switching on the projector or before the start of a projection of the image to be projected.

According to another preferred refinement, the projector includes a programming device, with the aid of which at least one parameter of the back radiation model is adaptable, in particular, manually, by a user. For example, at least one reflection coefficient of a projection surface to be used is adaptable. A skin tone of a hand intended to carry out control gestures can also be indicated, based on which reflection coefficients are adaptable or can be adapted for a subarea or for all of the pixels of the image to be projected using a reflection coefficient database of the projector. The adapted reflection coefficients can be automatically, partially or all used to adapt the back radiation model and/or partially or all used for adapting a control gesture detection model, on the basis of which the gesture detection device detects the control gestures.

According to another preferred refinement, the back radiation model takes wave length-dependent sensitivities of the radiation intensity detection device into account for at least one wave length of the visible light and/or for the infrared radiation, in particular, for all wave lengths of the visible light and/or for all wave lengths of the infrared radiation. If, for example, the entire image to be instantaneously projected is made up of pixels, which are to be projected with light having a wave length, only up to 10% of which is detected by the radiation intensity detection device, i.e., having a sensitivity for this wave length of 10%, then the infrared radiation can be emitted with a correspondingly high radiation intensity, so that control gestures are accurately detectable. If no, or only infrared radiation having a non-modulated, i.e., fixed radiation intensity were emitted, an actual back radiation intensity measuring signal could result, which is disadvantageously minimal for an accurate control gesture detection.

According to another preferred refinement, the back radiation model takes wave length dependent predetermined and/or determinable reflection coefficients of a projection surface and/or of an object or body part into account, in each case relative to at least one wave length of the visible light and relative to the infrared radiation.

According to one preferred refinement, the method includes the steps: detecting a control gesture based on the pixel-by-pixel generated actual back radiation intensity measuring signals of the predetermined pixels; and generating a control signal based on the detected control gesture. In addition, the generated control signal can be transmitted to a control unit of the projector and the control unit can be adapted or operated based on the transmitted control signal. However, the control signal can also be output via an interface for controlling an external device.

According to another preferred refinement, the method includes the step of automatic creation or adaptation of the back radiation model based on at least one difference between at least one generated actual back radiation intensity measuring signal of at least one pixel of the predetermined pixels and the predetermined value.

According to another preferred refinement, the automatic creation or adaptation of the back radiation model includes an automatic determination or adaptation of a value for at least one wave length-dependent sensitivity SR, SG, SB, SIR of the radiation intensity detection device for at least one wave length of the visible light and/or for the infrared radiation.

According to another preferred refinement, the automatic creation or adaptation of the back radiation model includes an automatic determination or adaptation of a wave length-dependent reflection coefficient, R % R, R % G, R % B, R % IR, of a projection surface and/or of an object or of a body part, in each case relative to at least one wave length of the visible light and relative to the infrared radiation.

The present invention is explained in greater detail below with reference to the exemplary embodiments depicted in the schematic figures of the drawings. In all figures, similar or functionally similar elements and devices are, unless otherwise indicated, provided with the same reference numerals. The numbering of method steps is provided for purposes of clarity and, in particular, is not intended, unless otherwise indicated, to imply a certain chronological sequence. Multiple method steps can also be carried out simultaneously.

DETAILED DESCRIPTION

Figure 1:
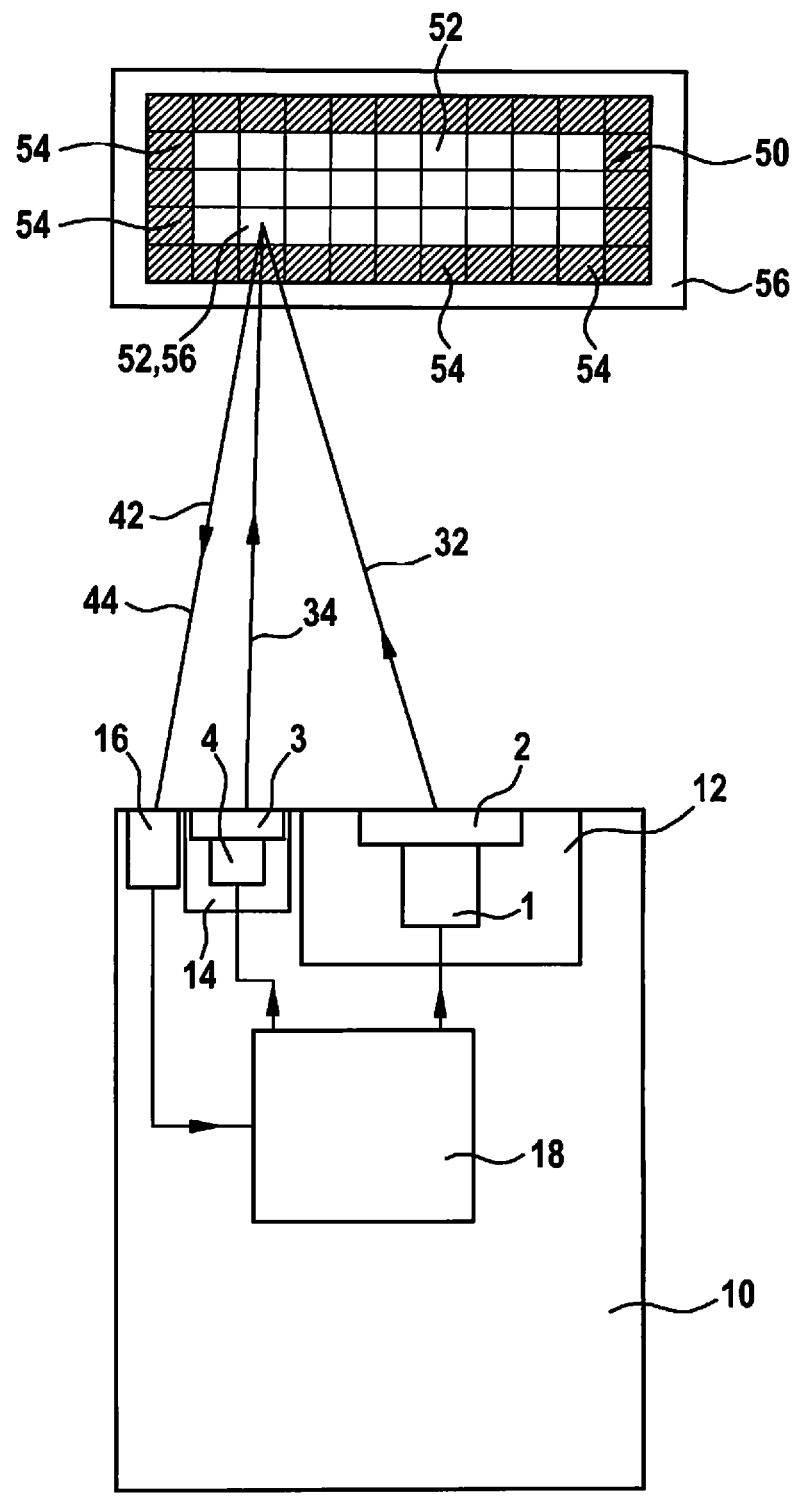
FIG. 1 schematically shows a block diagram of a projector for projecting an image pixel by pixel according to a first example embodiment of the present invention.

FIG. 1 schematically shows a block diagram of a projector 10 for projecting an image 50 pixel by pixel according to a first specific embodiment of the present invention.

According to FIG. 1, projector 10 includes a light diode device 12 for emitting visible light 32 pixel by pixel. Light diode device 12 includes a light-generating diode 1, with the aid of which monochromatic light 32 can be generated and an optical deflection device 2, with the aid of which light 32 generated by light-generating diode 1 pixel by pixel for projecting an image 50 on a projection surface 56 is deflectable. Optical deflection device 2 can include, for example, one or two or more micro-mirrors, lenses, apertures, etc. White light can also be emitted, for example, instead of monochromatic light.

Projector 10 also includes an infrared diode device 14, which includes a diode 4 generating an infrared radiation 34, as well as an optical deflection device 3 for generated infrared radiation 34, so that the generated infrared radiation is deflectable for emitting infrared radiation 34 pixel by pixel in accordance with the image to be projected. Optical deflection device 3 for infrared radiation 34 can, for example, also include one or two or even more micro-mirrors, lenses, apertures, etc.

A control unit 18 of projector 10 is designed to control light diode device 12 pixel by pixel for emitting visible light 32 in accordance with image 50 to be projected. In the process, pixels 52 depicted schematically in FIG. 1 in low numbers in a frontal view are projected one after the other on projection surface 56, which results for a human observer in overall image 50 to be projected. The projection can take place iteratively and continuously, image 50 to be projected being adaptable according to the chronological progression of the image data available to the control unit 18, for example, for presenting a slide show or a video.

Projector 10 includes a radiation intensity detection device 16 for detecting pixel by pixel a back radiation intensity of reflected visible light 42 and reflected infrared radiation 44. According to the first specific embodiment, constant reflection coefficients are assumed throughout across all wave lengths and across all pixels of predetermined pixels 54. An actual back radiation intensity measuring signal is generated pixel by pixel with the aid of radiation intensity detection device 16 based on the detected back radiation intensities.

Control unit 18 is also designed to control infrared diode device 14 pixel by pixel for emitting infrared radiation 34 based on image 50 to be projected and on a back radiation model in such a way that a setpoint back radiation intensity to be expected pixel by pixel for predetermined pixels 54 exhibits a predetermined value I-const. According to the first specific embodiment, the predetermined pixels 54 are situated at the outermost circumferential edge of image 50 to be projected. Alternatively, all pixels 52 can also be defined as predetermined pixels 54.

The back radiation model according to the first specific embodiment takes a wave length-dependent sensitivity of the radiation intensity detection device 16 into account for the wave length or wave lengths at which visible light 32 is emitted and for the wave length or wave lengths at which infrared radiation 34 is emitted. Accordingly, control unit 18 controls light diode device 12 and infrared diode device 14 in such a way that the setpoint back radiation intensity measuring signal to be expected pixel by pixel has predetermined value I-const for predetermined pixels 54.

Figure 2:
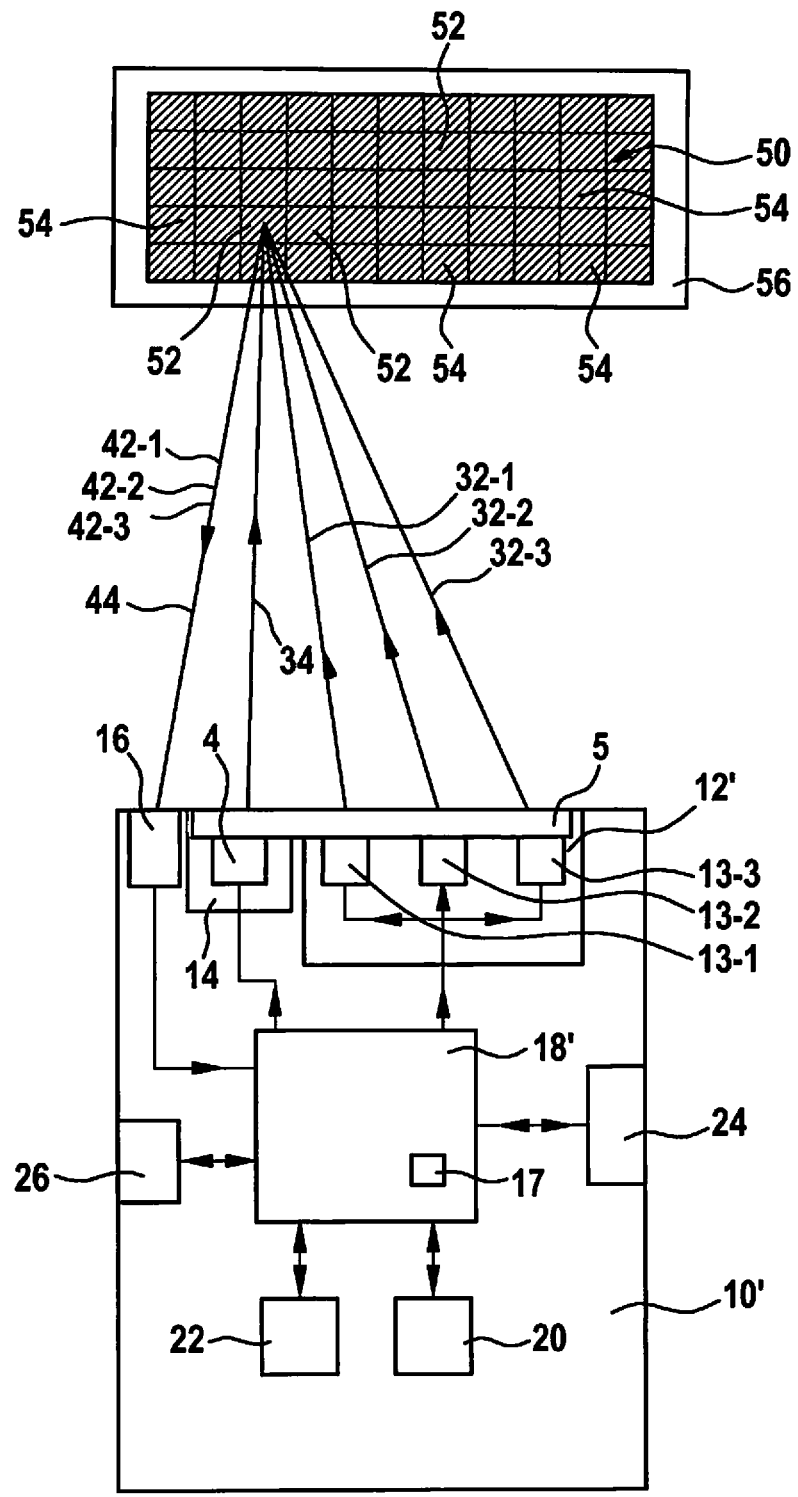
FIG. 2 shows a projector for projecting an image pixel by pixel according to a second example embodiment of the present invention.

FIG. 2 shows a projector 10" for projecting an image 50 pixel by pixel according to a second specific embodiment of the present invention. The projector according to the second specific embodiment is a variant of projector 10 according to the first specific embodiment.

According to the second specific embodiment, all pixels 52 of image 50 to be projected are predetermined pixels 54, i.e., the radiation intensity with which infrared diode device 14 emits infrared radiation 34 is modulated with the aid of control unit 18' for each pixel 52 of image 50 to be projected.

In contrast to the first specific embodiment, light diode device 12' includes three individual light-generating diodes 13-1, 13-2, 13-3, referred to below together as 13-i, first light-generating diode 13-1 being designed to generate visible light in a wave length range assigned to red light, second light-generating diode 13-2 being designed to generate visible light in a wave length range assigned to green light, and third light-generating diode 13-3 being designed to generate visible light in a wave length range assigned to blue light.

Instead of optical deflection devices 2 and 3, light diode device 12' includes an optical deflection device 5, with the aid of which both light 32-i generated by light generating diode 13-i as well as infrared radiation 34 generated by infrared radiation 34 generating diode 4 are deflectable pixel by pixel for projecting image 50 onto projection surface 56. Optical deflection device 5 can, for example, include one or two or even more micro-mirrors, lenses, apertures, etc. and can include shared optical elements and/or individual optical elements for each of three light-generating diodes 13-i. The same micro-mirrors of optical deflection device 5 are advantageously used for all generated light beams 32-i and for generated infrared radiation 34. Light diode device 12' is controllable with the aid of control unit 18' pixel by pixel for emitting visible light 32-i in accordance with image 50 to be projected.

According to the second specific embodiment, projector 10' also includes a gesture detection device 20, which is designed to detect a control gesture based on the detected back radiation intensity per pixel of predetermined pixels 54, and to transmit a control signal based on the detected control gesture to control unit 18', which is operable or adaptable based on the transmitted control signal. The gestures can, for example, be detected based on differences in the pixel-by-pixel generated actual back radiation intensity measuring signal of predetermined pixels 54 as compared to the respective pixel-related setpoint back radiation intensity measuring signal. Because, according to the present invention, the pixel related setpoint back radiation intensity measuring signal per pixel is constant according to the second specific embodiment for all pixels of image 50 to be projected, changes to the pixel-related actual back radiation intensity measuring signal are always clearly detectable, in particular, regardless of with which radiation intensity of visible light 32-i a respective pixel is projected.

Projector 10' also includes a calibration device 22, with the aid of which the back radiation model is automatically creatable or automatically adaptable based on at least one difference between at least one actual back radiation intensity measuring signal of at least one pixel of predetermined pixels 54 and the corresponding setpoint back radiation intensity measuring signal of the pixel.

Whereas image 50 to be projected or the plurality or chronological sequence of images 50 to be projected is transmittable via an interface 26 to control unit 18', it is possible for at least one test image data set to be permanently stored in a permanent data memory device 17 of unit 18'. In conjunction with a calibration, it can be provided that control unit 18' controls light diode device 12 and infrared diode device 14 in such a way that these project the at least one test image pixel by pixel. The back radiation model is adapted at least with respect to the at least one pixel of the test image on the basis of at least one difference between at least one actual back radiation intensity measuring signal of at least one pixel, according to the at least one test image, and the predefined value. In this way, for example, the characteristic of instantaneous projection surface 56 can be detected pixel by pixel with respect to its reflection coefficients before the start of the projection of image 50 to be projected, and can be used to calibrate a back radiation model to be instantaneously used.

Alternatively or in addition, the back radiation model v be continuously or regularly adapted based on differences between at least one actual back radiation intensity measuring signal of at least one pixel of predetermined pixels 54 and the predetermined value. The at least one pixel of predetermined pixels 54 in this case is preferably not part of a subarea of the pixels in which a control gesture is instantaneously detected. Thus, the back radiation model can be continuously improved and/or be adapted or be adaptable to a changed projection surface 56.

Alternatively or in addition, it v be provided that a user v send a calibration instruction to control unit 18' via a programming device 24 of projector 10', whereupon an unplanned calibration, as it is described above, for example, is carried out.

Alternatively or in addition, at least one parameter of the back radiation model v also be adaptable by the user with the aid of programming device 24. An advantageous setting of the back radiation model v be selected manually by the user, for example, in the case of a continuously changing projection surface 56, for example, a stretch of running water or a projection surface provided with a further moving image. A skin color shade of a skin of the user v also be input, for example, on the basis of which calibration device 22 adapts the back radiation model in such a way that at least those pixels v be evaluated in which a control gesture is detected, while taking the reflection coefficients of the input skin shade into account.

Figure 3:
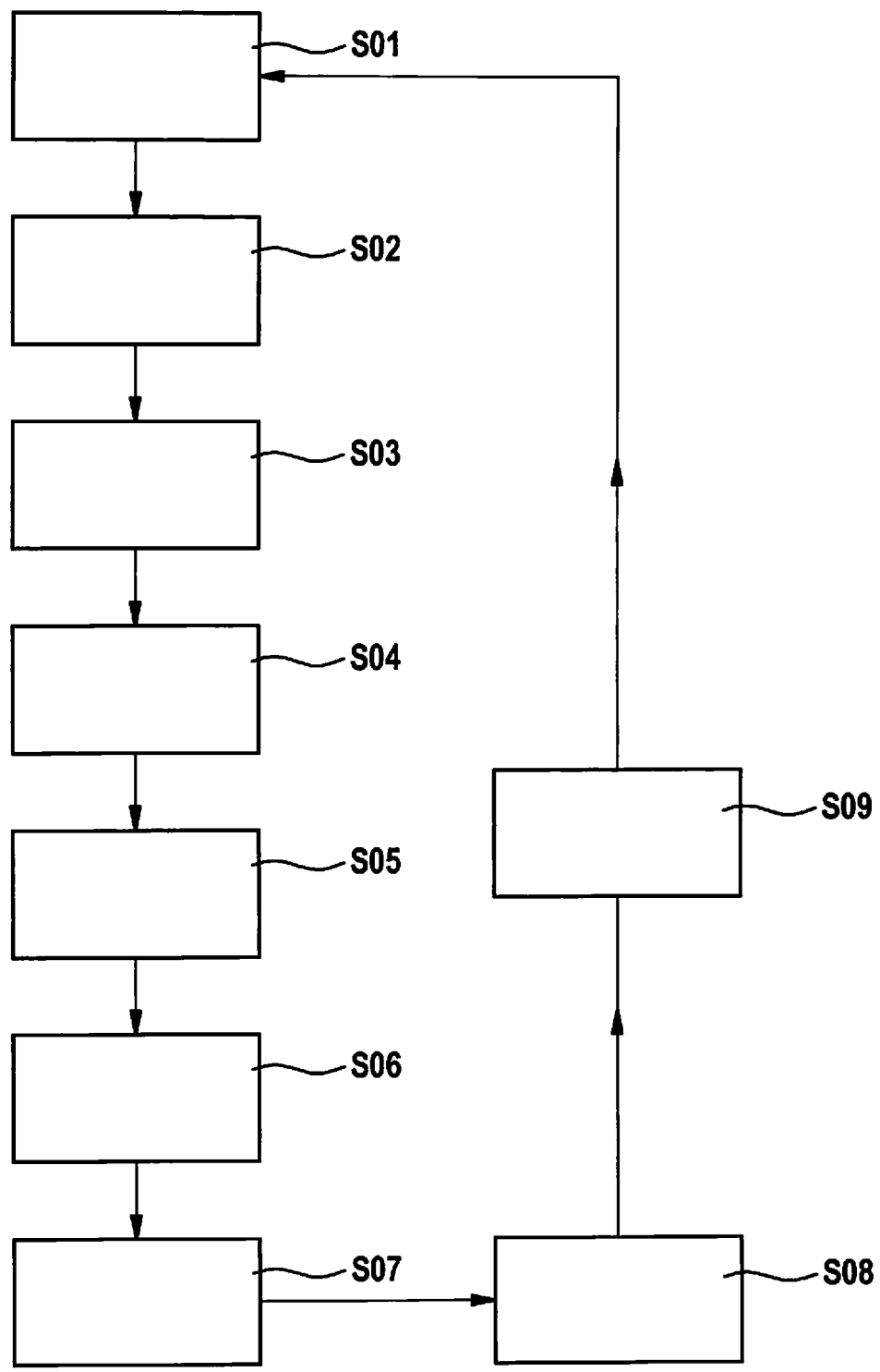
FIG. 3 is a flowchart that illustrates a method for projecting an image to be projected pixel by pixel according to an example embodiment of the present invention.

FIG. 3 is a flowchart that illustrates a method for projecting pixel by pixel an image 50 to be projected according to an example embodiment of the present invention. The method can be advantageously carried out using a device as described above, for example, according to the second example embodiment. Accordingly, the method is adaptable according to all refinements of the device according to the present invention and vice versa. For details on the method steps described, reference is therefore also made to the preceding description regarding the device according to the second example embodiment.

In a first step S01, a light diode device 12 of a projector 10; 10' for emitting visible light 32; 32-1, 32-2, 32-3 pixel by pixel is controlled in accordance with image 50 to be projected.

In a step S02, a back radiation intensity of reflected visible light 42; 42-$i$ and reflected infrared radiation 44 is detected pixel by pixel for predetermined pixels 54. In a step S03, an actual back radiation intensity measuring signal is generated pixel by pixel based on the detected back radiation intensities.

In a step S04, an infrared diode device 14 of projector 10; 10' for emitting infrared radiation 34 pixel by pixel is controlled in such a way that a setpoint back radiation intensity measuring signal calculated pixel by pixel with the aid of a back radiation model to be expected for the actual back radiation intensity measuring signal is constant for predetermined pixels 54. All pixels of the image can be predetermined pixels 54, for example.

In a step S05, a control gesture is detected based on the detected actual-back radiation intensity measuring signals of predetermined pixels 54. In a step S06, a control signal is generated based on the detected control gesture. In a step S07, the generated control signal is transmitted to a control unit 18' of projector 10; 10'. In a step S08, control unit 18' is adapted or controlled based on the transmitted control signal. Alternatively, the generated control signal can also be transmitted in step S07 to an external device, for example, via a wired or wireless interface.

In a step S09, the back radiation model is automatically adapted based on at least one difference between at least one actual back radiation intensity measuring signal of at least one pixel of predetermined pixels 54 and the predetermined constant value I-const. This step can be carried out, in particular, multiple times, for example, after each scanning pass of a laser scanner.

Although the present invention has been described above with reference to preferred exemplary embodiments, it is not limited thereto, but is modifiable in a number of ways. The present invention can, in particular, be changed or modified in different ways without departing from the essence of the present invention.

The radiation intensity detection device can, for example, be situated outside the housing of the projector and can be coupled or can be coupleable to the control unit and/or to the gesture detection device via a wired or a wireless interface.

What is claimed is:

1. A projector comprising:
   a control unit;
   a light diode device;
   an infrared diode device, wherein the control unit is configured to control (a) the light diode device, on a pixel by pixel basis, to emit visible light, pixel by pixel, based on an image to be projected, and (b) the infrared diode device, based on the image to be projected and on a back radiation model, to emit the infrared radiation pixel by pixel, the control being performed in such a way that a setpoint back radiation intensity measuring signal to be expected pixel by pixel for an actual back radiation intensity measuring signal has a predetermined value for predetermined pixels;
   a radiation intensity detection device configured to:
      detect, pixel by pixel, a back radiation intensity of reflected visible light and of reflected infrared radiation; and
      generate the actual back radiation intensity measuring signal, pixel by pixel, based on the detected back radiation intensities; and
   a gesture detection device, wherein the gesture detection device is configured to detect a control gesture based on the pixel-by-pixel generated actual back radiation intensity measuring signals of the predetermined pixels, and to transmit a control signal based on the detected control gesture to the control unit, which is operable or adaptable based on the transmitted control signal.

2. The projector of claim 1, further comprising a calibration device, with the aid of which the back radiation model is automatically creatable or automatically adaptable based on at least one difference between at least one actual back radiation intensity measuring signal of at least one pixel of the predetermined pixels and the corresponding setpoint back radiation intensity measuring signal of the pixel.

3. The projector of claim 1, further comprising a programming device, with the aid of which at least one parameter of the back radiation model is adaptable by a user.

4. The projector of claim 1, wherein the back radiation model takes wave length-dependent sensitivities of the radiation intensity detection device into account for at least one of the infrared radiation and at least one wavelength of the visible light.

5. A method for projecting an image pixel by pixel, the method comprising:
   controlling a light diode device of a projector to emit, pixel by pixel, visible light in accordance with the image to be projected;
   detecting, pixel by pixel, a back radiation intensity of reflected visible light and reflected infrared radiation for the predetermined pixels;
   generating, pixel by pixel, an actual back radiation intensity measuring signal based on the detected back radiation intensities;
   controlling an infrared diode device of a projector for emitting infrared radiation pixel by pixel based on the image to be projected and on a back radiation model, in such a way that a setpoint back radiation intensity measuring signal to be expected pixel by pixel for the actual back radiation intensity measuring signal has a predetermined value for predetermined pixels;
   detecting a control gesture based on the pixel-by-pixel generated actual back radiation intensity measuring signals of the predetermined pixels; and
   generating a control signal based on the detected control gesture.

6. The method of claim 5, further comprising:
   automatically creating or adapting the back radiation model based on at least one difference between at least one generated actual back radiation intensity measuring signal of at least one pixel of the predetermined pixels and the predetermined value.

7. The method of claim 6, wherein the automatic creation or adaptation of the back radiation model includes an automatic determination or adaptation of a value for at least one wave length-dependent sensitivity of the radiation intensity detection device for at least one of the infrared radiation and at least one wave length of the visible light.

* * * * *